(12) United States Patent
DiCarlo et al.

(10) Patent No.: US 7,450,297 B2
(45) Date of Patent: Nov. 11, 2008

(54) UNIQUE METHOD FOR MANUFACTURING A DIGITAL MICROMIRROR DEVICE AND A METHOD FOR MANUFACTURING A PROJECTION DISPLAY SYSTEM USING THE SAME

(75) Inventors: Anthony DiCarlo, Richardson, TX (US); Stephen Meisner, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 283 days.

(21) Appl. No.: 11/203,854

(22) Filed: Aug. 15, 2005

(65) Prior Publication Data

US 2007/0035807 A1  Feb. 15, 2007

(51) Int. Cl.
G02B 26/00 (2006.01)
G02F 1/03 (2006.01)

(52) U.S. Cl. .................................. 359/291; 359/245
(58) Field of Classification Search ................... 359/291
See application file for complete search history.

(56) References Cited

U.S. PATENT DOCUMENTS

| 6,323,982 | B1 * | 11/2001 | Hornbeck | 359/224 |
|---|---|---|---|---|
| 6,536,904 | B2 | 3/2003 | Kunzman | |
| 6,814,445 | B2 | 11/2004 | Kalyandurg et al. | |
| 6,897,991 | B2 | 5/2005 | Huffman et al. | |
| 2002/0109903 | A1 * | 8/2002 | Kaeriyama | 359/290 |
| 2004/0136044 | A1 * | 7/2004 | Miller et al. | 359/223 |

* cited by examiner

Primary Examiner—Jordan M. Schwartz
Assistant Examiner—James C Jones
(74) Attorney, Agent, or Firm—W. James Brady, III; Frederick J. Telecky, Jr.

(57) ABSTRACT

The present invention provides a method for manufacturing a digital micromirror device and a method for manufacturing a projection display system. The method for manufacturing the digital micromirror device may include providing a material stack, the material stack including a spacer layer having one or more openings therein and located over control circuitry located on or in a semiconductor substrate, a layer of hinge material located over the spacer layer and within the one or more openings, and a layer of hinge support material located over the layer of hinge material and within the one or more openings. The method may further include patterning the layer of hinge support material using photoresist, patterning the layer of hinge material using the patterned layer of hinge support material as a hardmask, and removing the patterned layer of hinge support material from over an upper surface of the patterned layer of hinge material.

20 Claims, 12 Drawing Sheets

UNIQUE METHOD FOR MANUFACTURING A DIGITAL MICROMIRROR DEVICE AND A METHOD FOR MANUFACTURING A PROJECTION DISPLAY SYSTEM USING THE SAME

TECHNICAL FIELD OF THE INVENTION

The present invention is directed, in general, to a digital micromirror device and, more specifically, to a unique method for manufacturing a digital micromirror device and a method for manufacturing a projection display system using the same.

BACKGROUND OF THE INVENTION

A Digital Micromirror Device (DMD) is a type of microelectromechanical systems (MEMS) device. Invented in 1987 at Texas Instruments Incorporated, the DMD is a fast, reflective digital light switch. It can be combined with image processing, memory, a light source, and optics to form a digital light processing® system capable of projecting large, bright, high-contrast color images.

The DMD is fabricated using CMOS-like processes over a CMOS memory. It has an array of individually addressable mirror elements, each having an aluminum mirror that can reflect light in one of two directions depending on the state of an underlying memory cell. With the memory cell in a first state, the mirror rotates to +12 degrees. With the memory cell in a second state, the mirror rotates to −12 degrees. By combining the DMD with a suitable light source and projection optics, the mirror reflects incident light either into or out of the pupil of the projection lens. Thus, the first state of the mirror appears bright and the second state of the mirror appears dark. Gray scale is achieved by binary pulse width modulation of the incident light. Color is achieved by using color filters, either stationary or rotating, in combination with one, two, or three DMD chips.

DMD's may have a variety of designs, and the most popular design in current use is a structure consisting of a mirror that is rigidly connected to an underlying yoke. The yoke in turn is connected by two thin, mechanically compliant torsion hinges to support posts that are attached to the underlying substrate. Electrostatic fields developed between the underlying memory cell and the mirror cause rotation in the positive or negative rotation direction.

The fabrication of the above-described DMD superstructure begins with a completed CMOS memory circuit. Through the use of photoresist layers, the superstructure is formed with alternating layers of aluminum for the address electrode, hinge, yoke, and mirror layers and hardened photoresist for sacrificial layers that form air gaps. Unfortunately, the manufacture of the elements of the superstructure may require many different steps, thus it can be time consuming and costly.

Accordingly, what is needed in the art is a method for manufacturing a DMD that does not experience the drawbacks of the prior art methods.

SUMMARY OF THE INVENTION

To address the above-discussed deficiencies of the prior art, the present invention provides a method for manufacturing a digital micromirror device and a method for manufacturing a projection display system. The method for manufacturing the digital micromirror device, without limitation, may include providing a material stack, the material stack including a spacer layer having one or more openings therein and located over control circuitry located on or in a semiconductor substrate, a layer of hinge material located over the spacer layer and within the one or more openings, and a layer of hinge support material located over the layer of hinge material and within the one or more openings. The method may further include patterning the layer of hinge support material using photoresist, patterning the layer of hinge material using the patterned layer of hinge support material as a hardmask, and removing the patterned layer of hinge support material from over an upper surface of the patterned layer of hinge material.

As briefly mentioned, the present invention also discloses a method for manufacturing a projection display system. This method, among other steps, may include: 1) providing a light source configured to produce a beam of light along a first light path, 2) positioning optics in the first light path, the optics configured to provide one or more color light beams, 3) forming one or more digital micromirror devices as described above, the digital micromirror devices configured to receive the color light beams from the optics, modulate the light on a pixel-by-pixel basis and reflect light from ON pixels along a second light path, 4) providing control electronics for receiving image data and controlling the light source and the modulation of the digital micromirror devices, and 5) providing projection optics placed in the second light path magnifying and projecting an image on to a viewing screen.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

The invention is best understood from the following detailed description when read with the accompanying FIGUREs. It is emphasized that in accordance with the standard practice in the semiconductor industry, various features are not drawn to scale. In fact, the dimensions of the various features may be arbitrarily increased or reduced for clarity of discussion. Reference is now made to the following descriptions taken in conjunction with the accompanying drawings, in which.

DETAILED DESCRIPTION

Figure 1A:
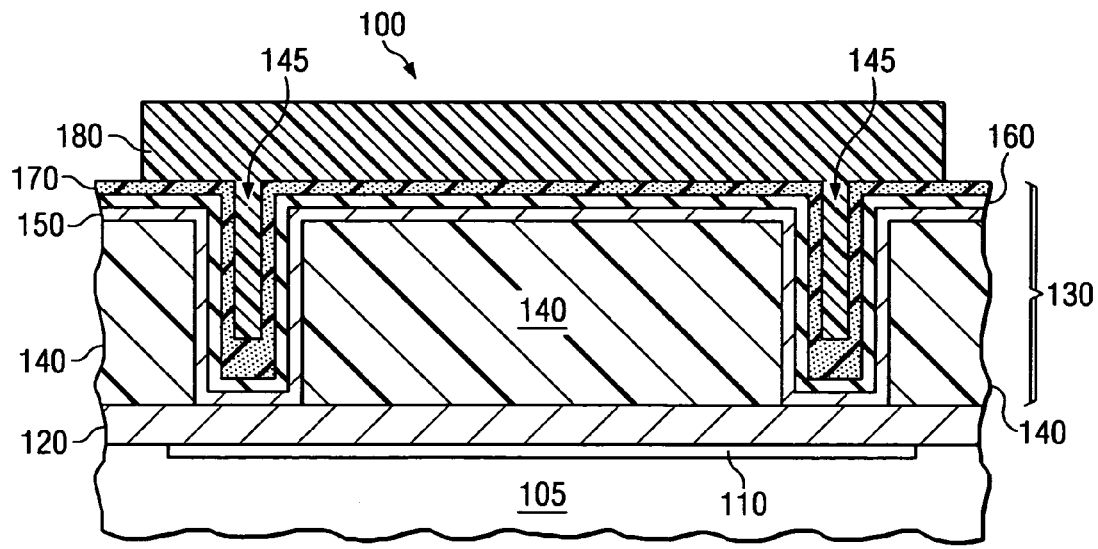
FIGS. 1A-10B illustrate cross-sectional and plan views of a digital micromirror device at various different stages of manufacture in accordance with the principles of the present invention.
Figure 1B:
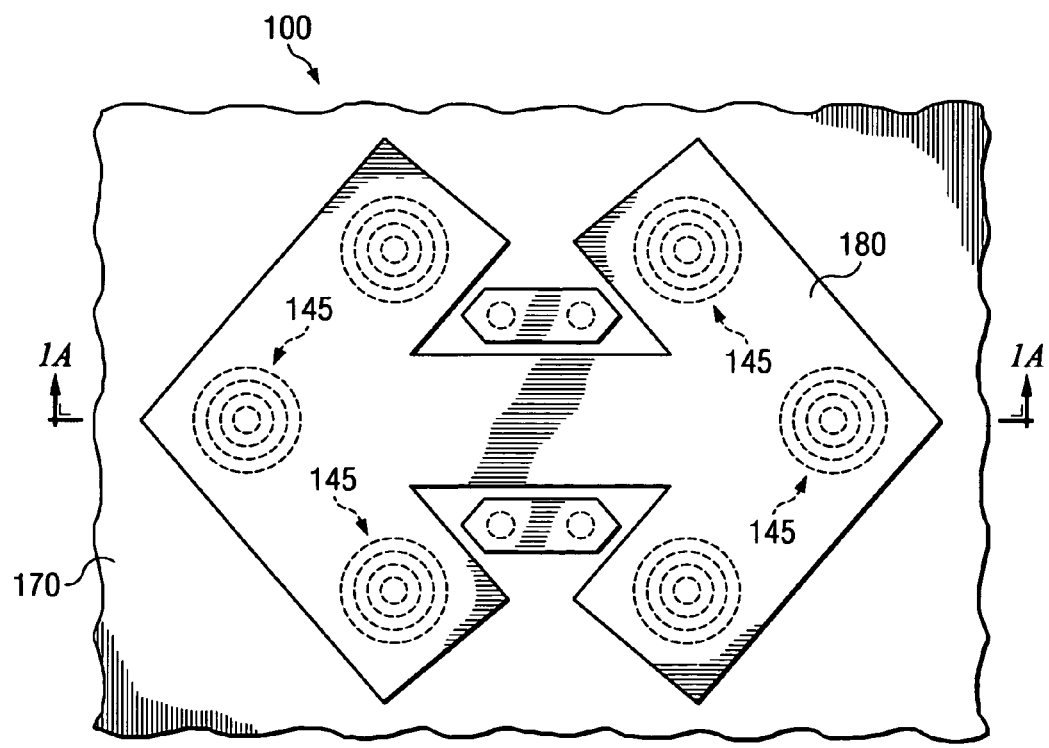

Turning to FIGS. 1A-10B illustrated are cross-sectional views and plan views illustrating how one skilled in the art might manufacture a digital micromirror device (DMD) in accordance with the principles of the present invention. Each of the given stages of manufacture is broken into a cross-sectional view (denoted as A) and a plan view (denoted as B). For example, at a given stage of manufacture, such as shown in FIG. 1, FIG. 1B is a plan view of the partially completed DMD and FIG. 1A is a cross-sectional view of the partially completed DMD taken through the section A-A illustrated in FIG. 1B. The same denotation is carried out throughout the majority of the document, including FIGS. 2A-10B. Accordingly, where like reference numbers are used, even if in different FIGUREs, the same feature is being illustrated.

Turning initially to FIGS. 1A and 1B, illustrated are a cross-sectional view and a plan view, respectively, of a DMD 100 at an initial stage of manufacture. The DMD 100 illustrated in FIGS. 1A and 1B includes control circuitry 110 formed on or in a semiconductor substrate 105. The semiconductor substrate 105, in an exemplary embodiment, may comprise a number of different materials while staying within the scope of the present invention. In the embodiment illustrated in FIG. 1, however, the semiconductor substrate 105 is epitaxial silicon.

The control circuitry 110 preferably comprises a plurality of CMOS devices, and more preferably, addressable SRAM circuits within the semiconductor substrate 105. Nevertheless, other embodiments may exist wherein additional or different circuitry may be included within the control circuitry 110 located on or in the semiconductor substrate 105. While not shown, the DMD 100 may further include an insulating layer formed over the control circuitry. The insulating layer preferably comprises an oxide such as silicon oxide that has been planarized by chemical mechanical planarization.

Located over the semiconductor substrate 105 is a conductive layer 120. The conductive layer 120 preferably comprises aluminum or aluminum alloy that has been sputter deposited to a thickness ranging from about 100 nm to about 400 nm. While not shown in the illustrated cross-section of FIG. 1A, vias may be formed in the insulating layer to allow the conductive layer 120 to contact the underlying control circuitry 110, where necessary. While also not shown in the illustrated cross-section, the conductive layer 120 may be patterned, resulting in electrode pads and a bias bus. Preferably the conductive layer 120 is patterned by plasma-etching using plasma-deposited silicon dioxide as the etch mask.

Positioned over the semiconductor substrate 105, the control circuitry 110, and the conductive layer 120 is a material stack 130. Without being limited to such, the material stack 130 may initially include a first spacer layer 140 having one or more openings 145 located therein. Preferably the first spacer layer 140 is formed by spin depositing a photoresist to a thickness ranging from about 400 nm to about 1500 nm. Thereafter, the one or more openings 145 may be formed within the first spacer layer 140. Conventional patterning and etching techniques may be used to form the openings 145 in the first spacer layer 140. For example, the openings 145 may be patterned into the first spacer layer 140 by exposing, patterning, developing and then descuming the first spacer layer 140. After patterning the openings 145 into the first spacer layer 140, the first spacer layer 140 may be deep UV hardened to a temperature of about 200° C. to prevent flow and bubbling during subsequent processing steps.

The material stack 130 further includes a layer of hinge material 150 located over the first spacer layer 140 and within the one or more openings 145. The layer of hinge material 150, in accordance with the principles of the present invention, may also be referred to as a binge metal layer. Preferably the layer of hinge material 150 is formed using similar procedures and materials as described above for the conductive layer 120. Accordingly, the layer of hinge material 150 may comprise aluminum or an aluminum alloy. Moreover, the layer of hinge material 150 typically has a desirable thickness ranging from about 30 nm to about 100 nm.

The material stack 130 in the embodiment of FIGS. 1A and 1B further includes a layer of hinge support material 160 located over the layer of hinge material 150 and within the one or more openings 145. In an exemplary embodiment, the layer of hinge support material 160 comprises a thin oxide layer blanket deposited over the layer of hinge material 150. For example, a silicon dioxide layer having a thickness ranging from about 50 nm to about 500 nm could be used as the layer of hinge support material 160, while remaining within the purview of the present invention.

The material stack 130 may, in certain embodiments, further include a bottom anti-reflective coating (BARC) layer 170 formed over the layer of hinge support material 160 and within the one or more openings 145. As those skilled in the art of photolithography are aware, the BARC layer 170 may or may not be used based upon the photolithography process being used. For instance, in those embodiments wherein the photolithography process uses a deep ultraviolet photoresist layer for patterning the various layers of the material stack 130, the BARC layer 170 will most likely be required. However, in certain other embodiments the BARC layer 170 may not be used. In any event, the BARC layer 170 may be formed to a thickness ranging from about 50 nm to about 200 nm, among others.

Positioned over the material stack 130 in the embodiment of FIG. 1A is a photoresist layer 180. The photoresist layer 180 may be any known or hereafter discovered photoresist layer while staying within the scope of the present invention. Nevertheless, the photoresist layer 180 in the embodiment of FIGS. 1A and 1B comprises a deep ultra-violet photoresist layer, configured to be used with an I-line lithography process. The photoresist layer 180 is preferably formed by spin depositing a blanket layer of photoresist material to a thickness ranging from about 150 nm to about 800 nm. Thereafter, the blanket layer of photoresist material may be conventionally patterned, resulting in the patterned photoresist layer 180. After patterning, the photoresist layer may be deep UV hardened to a temperature of about 180° C. to prevent flow and bubbling during subsequent processing steps.

Figure 2A:
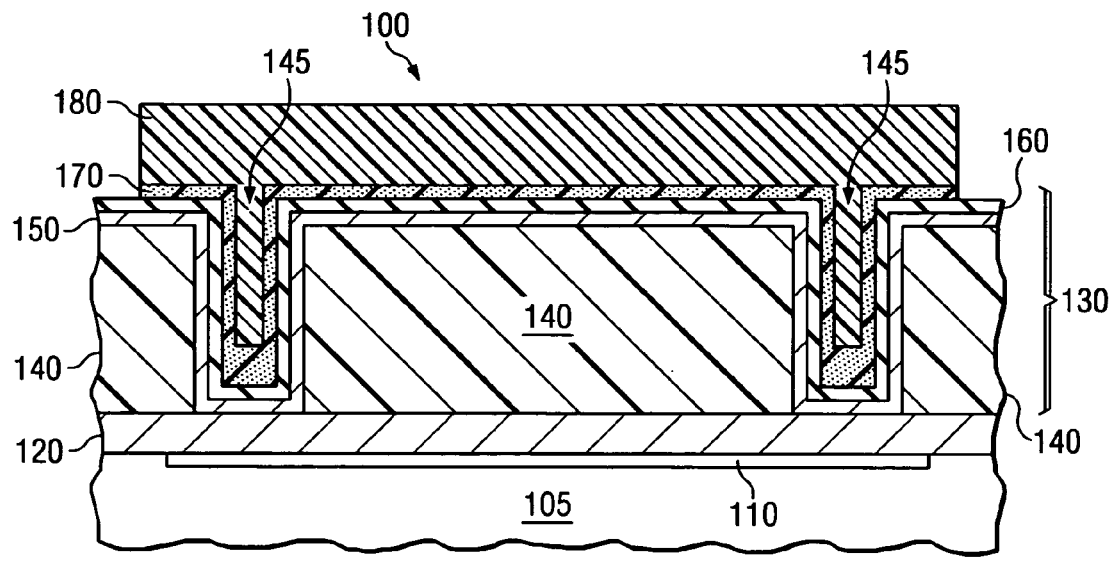
Figure 2B:
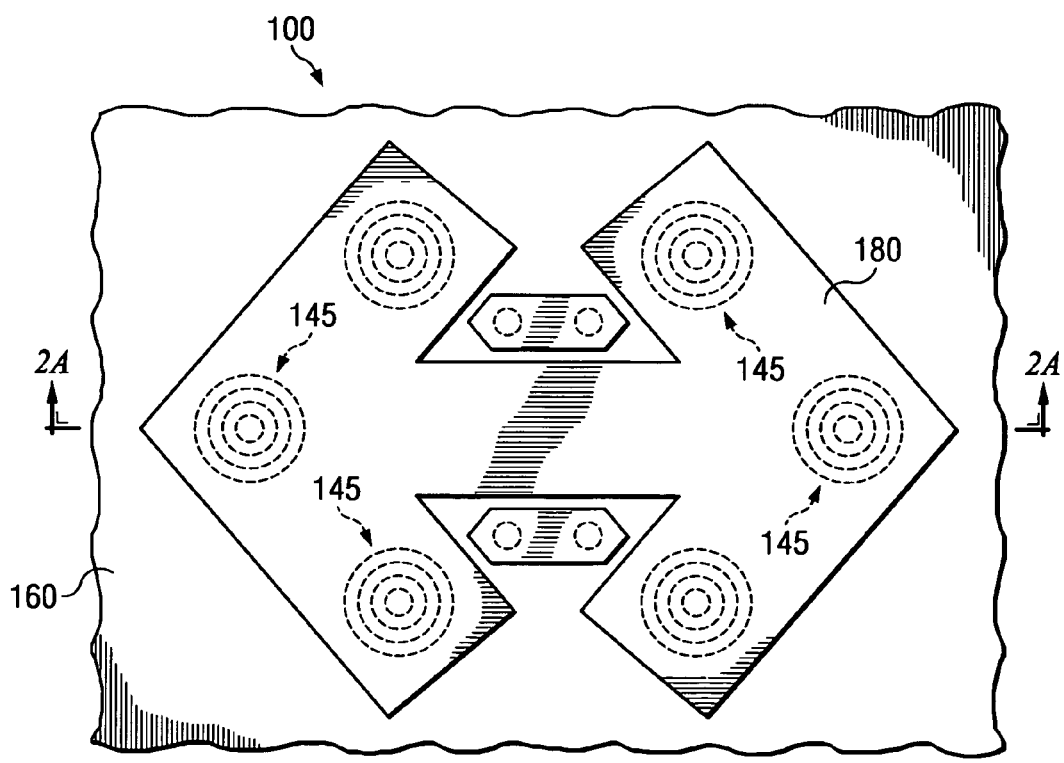

Turning now to FIGS. 2A and 2B, illustrated are a cross-sectional view and a plan view, respectively, of the DMD 100 illustrated in FIGS. 1A and 1B, respectively, after etching the BARC layer 170 using the patterned photoresist layer 180. The etch process used to etch the BARC layer 170 may obviously vary, however, one embodiment of the present invention uses a timed etch to etch the BARC layer 170. For example, depending on the thickness of the BARC layer 170, a 10 second timed etch using a helium/oxygen plasma, could be used to etch the BARC layer 170.

Figure 3A:
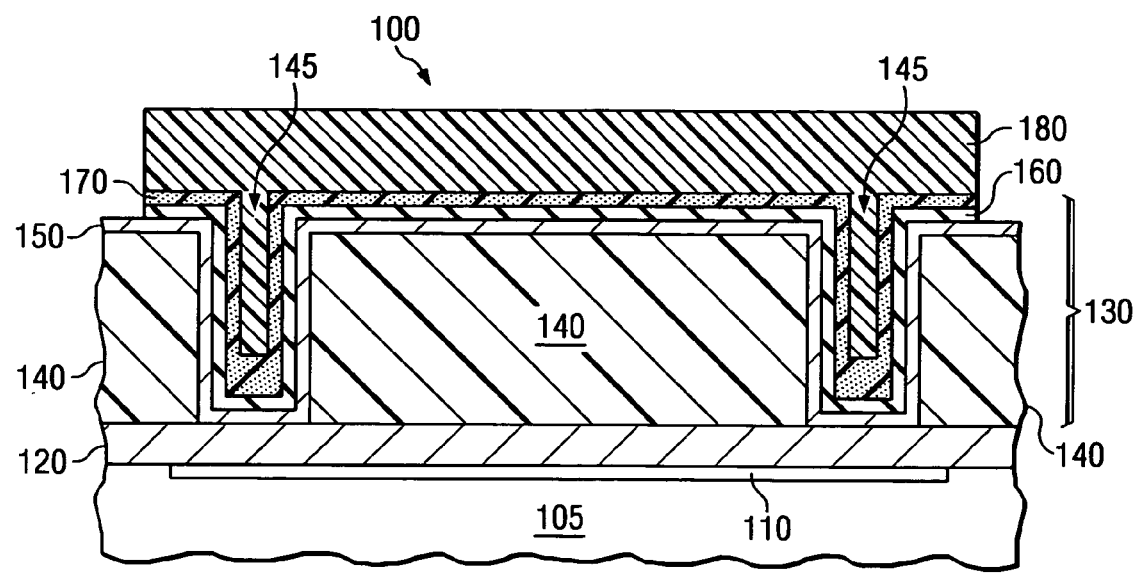
Figure 3B:
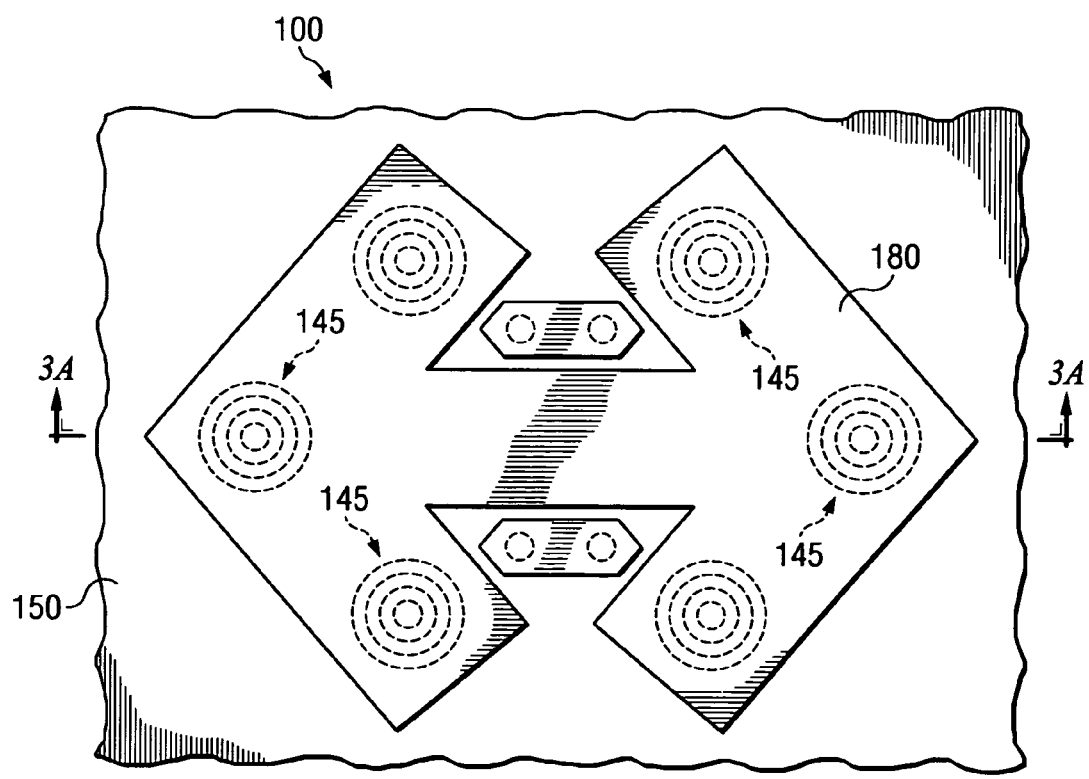

Turning now to FIGS. 3A and 3B, illustrated are a cross-sectional view and a plan view, respectively, of the DMD 100 illustrated in FIGS. 2A and 2B, respectively, after etching the layer of hinge support material 160 using the patterned photoresist layer 180. While not limited to such, the etch process used to etch the layer of hinge support material 160 may be substantially similar to the etch process used to etch the BARC layer 170 as discussed above. As the layer of hinge support material 160 may comprise an oxide rather than BARC material, the etch time for etching the layer of hinge support material 160 may increase. For example, one embodiment of the present invention uses a 26 second etch to etch the layer of hinge support material 160. After etching the layer of hinge support material 160, the partially completed DMD 100 may be subjected to a clean step. For example, the DMD 100 may be subjected to a 60 second develop clean to remove unwanted polymer.

Figure 4A:
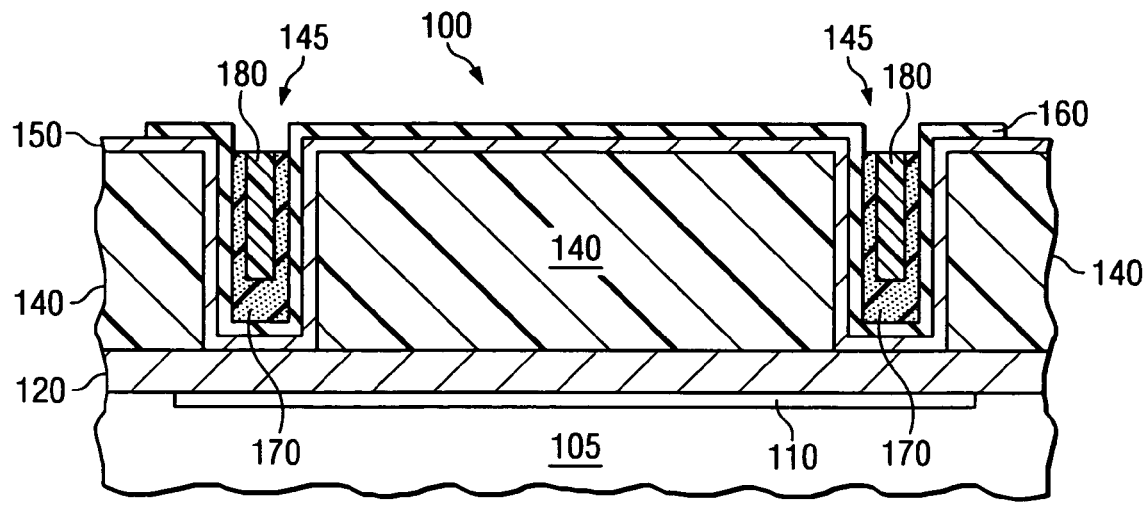
Figure 4B:
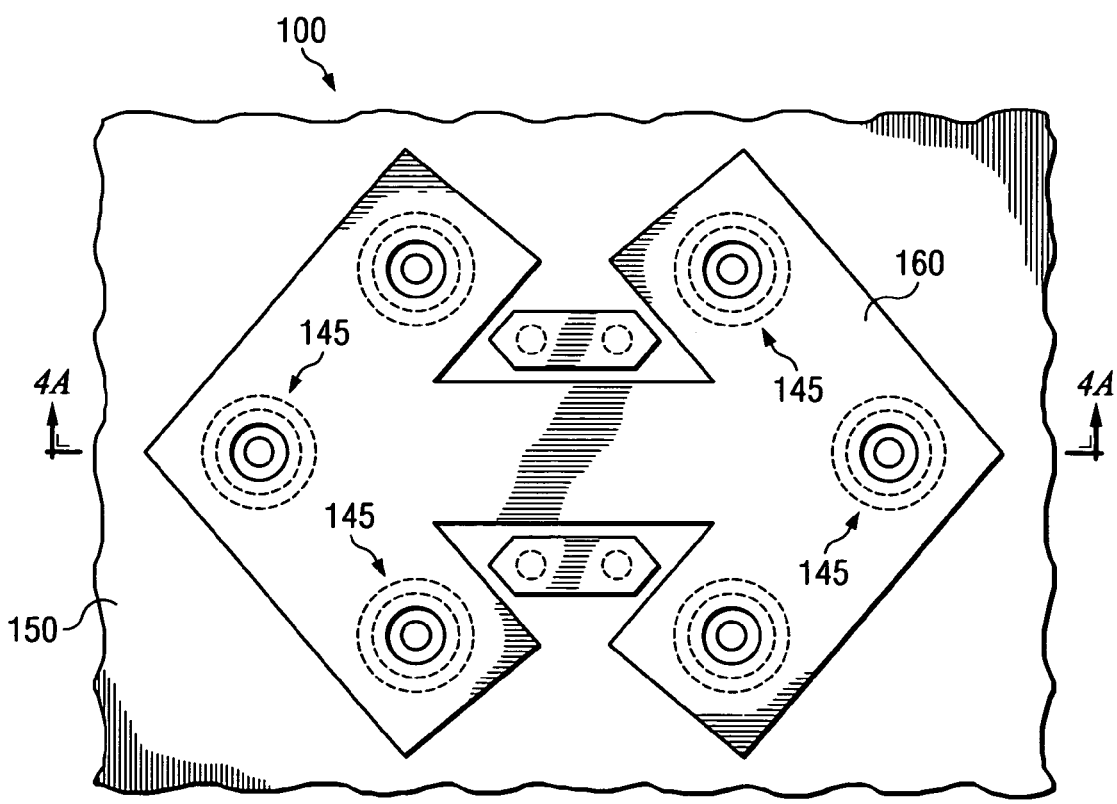

Turning now to FIGS. 4A and 4B, illustrated are a cross-sectional view and a plan view, respectively, of the DMD 100 illustrated in FIGS. 3A and 3B, respectively, after removing the photoresist layer 180 from over an upper surface of the layer of hinge support material 160, thereby leaving a portion of the photoresist layer 180 within the one or more openings 145. In an exemplary embodiment, the BARC layer 170 is also removed from over the upper surface of the layer of hinge support material 160, but also remains within the one or more openings 145. Optimally, the photoresist layer 180 remaining within the one or more openings 145 leaves less than about 50 percent of the one or more openings 145 unfilled. For example, in one embodiment less than about 20 percent of the one or more openings 145 remains unfilled. As the photoresist layer 180, and possibly the BARC layer 170, remains within the one or more openings 145, and more importantly somewhat filling the one or more openings 145, the one or more openings 145 are protected from various subsequent processing steps, including the steps shown and discussed with respect to FIGS. 5A-5B and 7A-7B.

The photoresist layer 180 and the BARC layer 170 may be removed from over the layer of hinge support material 160 using various different processes. However, one embodiment of the present invention uses a modified version of the etch process used to etch the BARC layer 170, as discussed above with respect to FIGS. 2A and 2B. Accordingly, this etch process might include a helium/oxygen plasma.

Figure 5A:
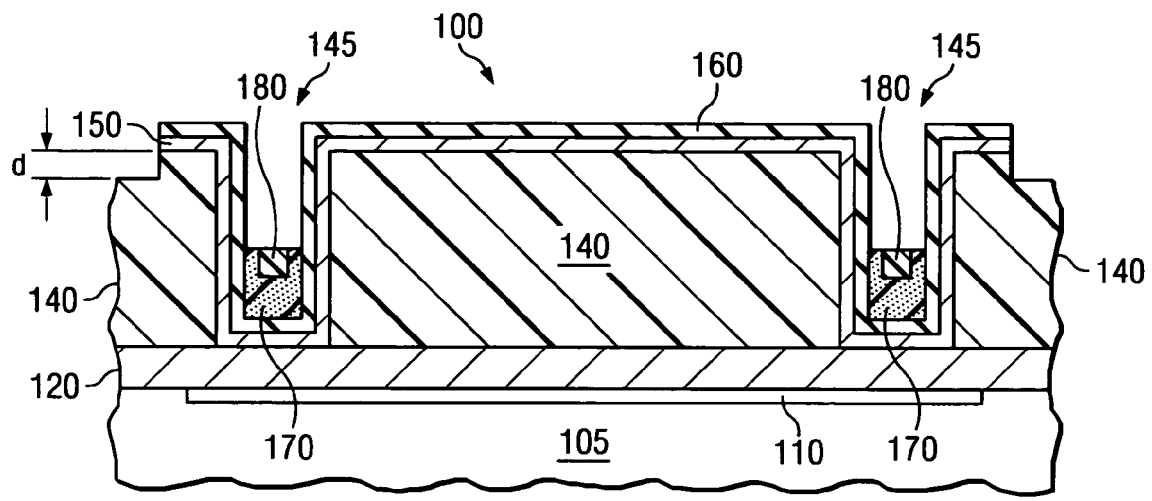
Figure 5B:
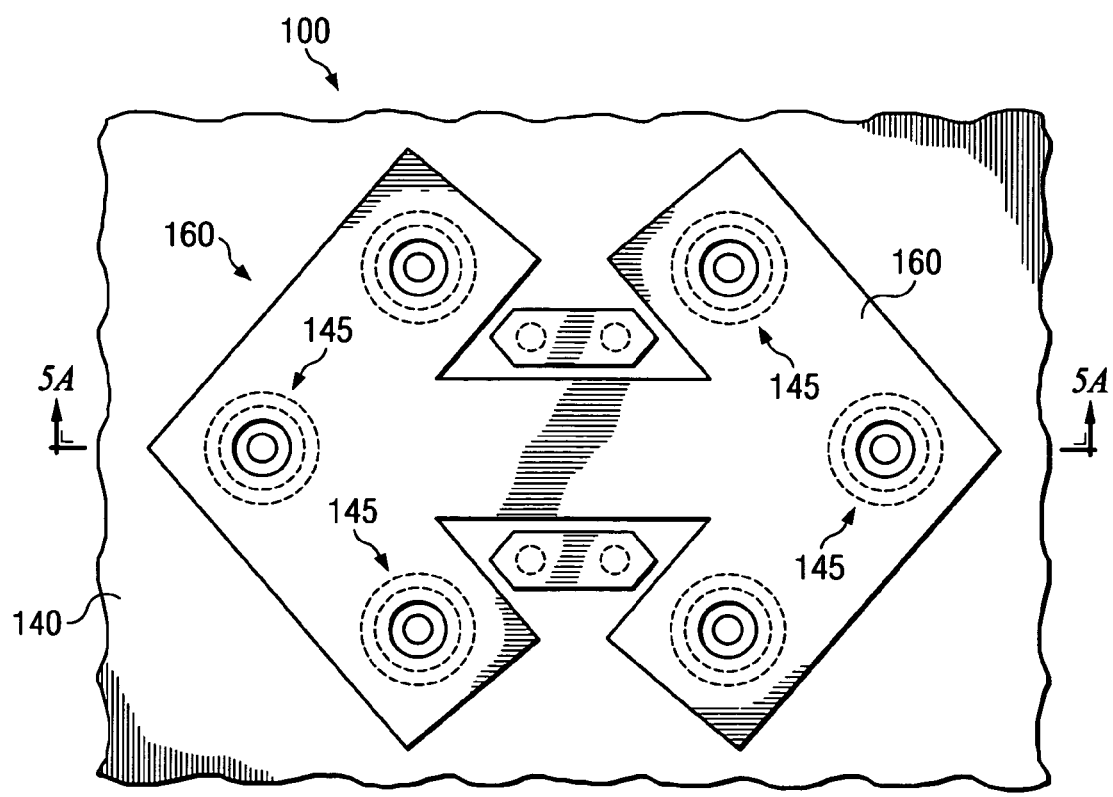

Turning now to FIGS. 5A and 5B, illustrated are a cross-sectional view and a plan view, respectively, of the DMD 100 illustrated in FIGS. 4A and 4B, respectively, after patterning the layer of hinge material 150 using the patterned layer of hinge support material 160 as a hardmask. As is shown in FIG. 5A, this etch process may etch into the first spacer layer 140 a distance (d). While etching into the first spacer layer 140 is generally significant and uncontrollable, the unique process of the present invention allows the distance (d) at which the etch process etches into the first spacer layer 140 to be reduced. For example, in one embodiment of the present invention the distance (d) is less than about 250 nm. In another exemplary embodiment, the distance (d) is less than about 50 nm.

The process for etching the layer of hinge material 150 may vary. For example, in one embodiment of the present invention the layer of hinge material 150 is etched using a chlorine based plasma. Nevertheless, other etch chemistries or plasmas are within the scope of the present invention. After finishing etching the layer of hinge material 150, the partially completed DMD 100 may again be subjected to a clean step. For example, the DMD 100 may again be subjected to a 60 second develop clean to remove unwanted polymer. Take notice how, in certain embodiments, the etching of the layer of hinge material 150 also removes a portion of the material located within the openings 145.

Figure 6A:
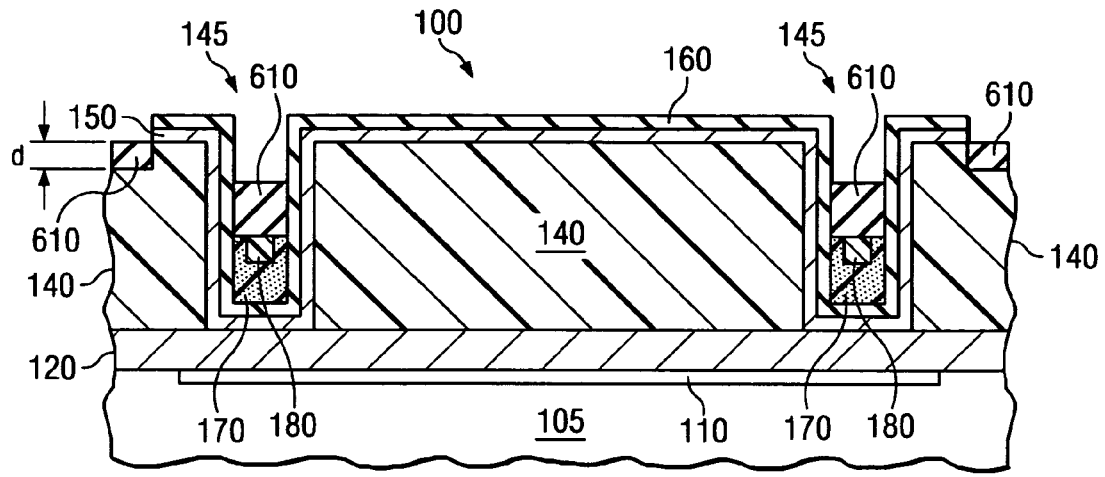
Figure 6B:
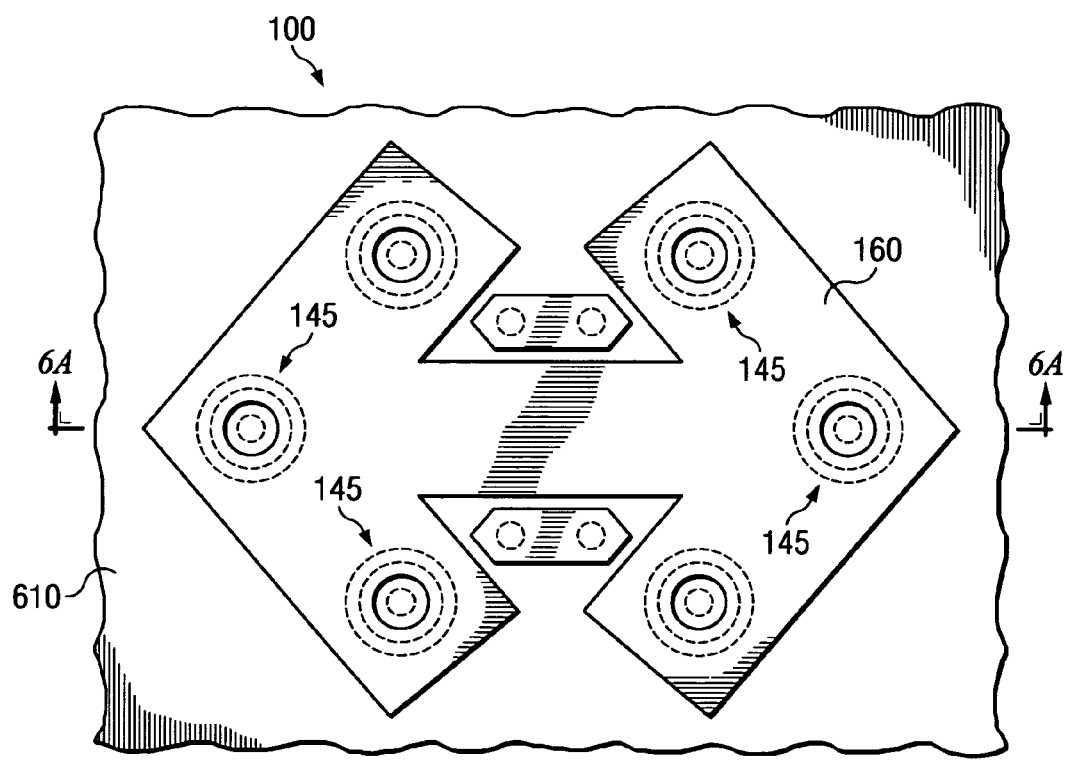

Turning now to FIGS. 6A and 6B, illustrated are a cross-sectional view and a plan view, respectively, of the DMD 100 illustrated in FIGS. 5A and 5B, respectively, after optionally forming a filling material 610 within the one or more openings 145 and the etched portions of the first spacer layer 140. In one embodiment of the present invention, the filling material 610 remains after blanket depositing a BARC layer over the layer of hinge support material 160 and within the one or more openings 145 and etched portions of the first spacer layer 140, then subjected the deposited BARC layer to a BARC layer etch. What ideally results is the one or more openings 145 being filled with the BARC and the etched portions being substantially filled with the BARC, and thus no longer present. Nevertheless, the complete planarization of the etched portions is often difficult to attain. In any event, the etched portions are not as significant as they were prior to the formation of the filling material 610.

Figure 7A:
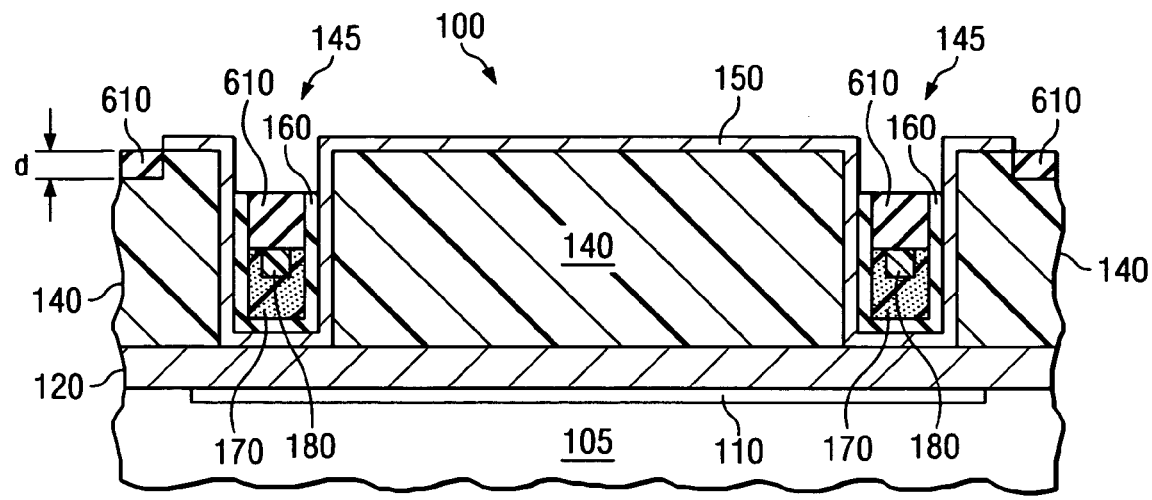
Figure 7B:
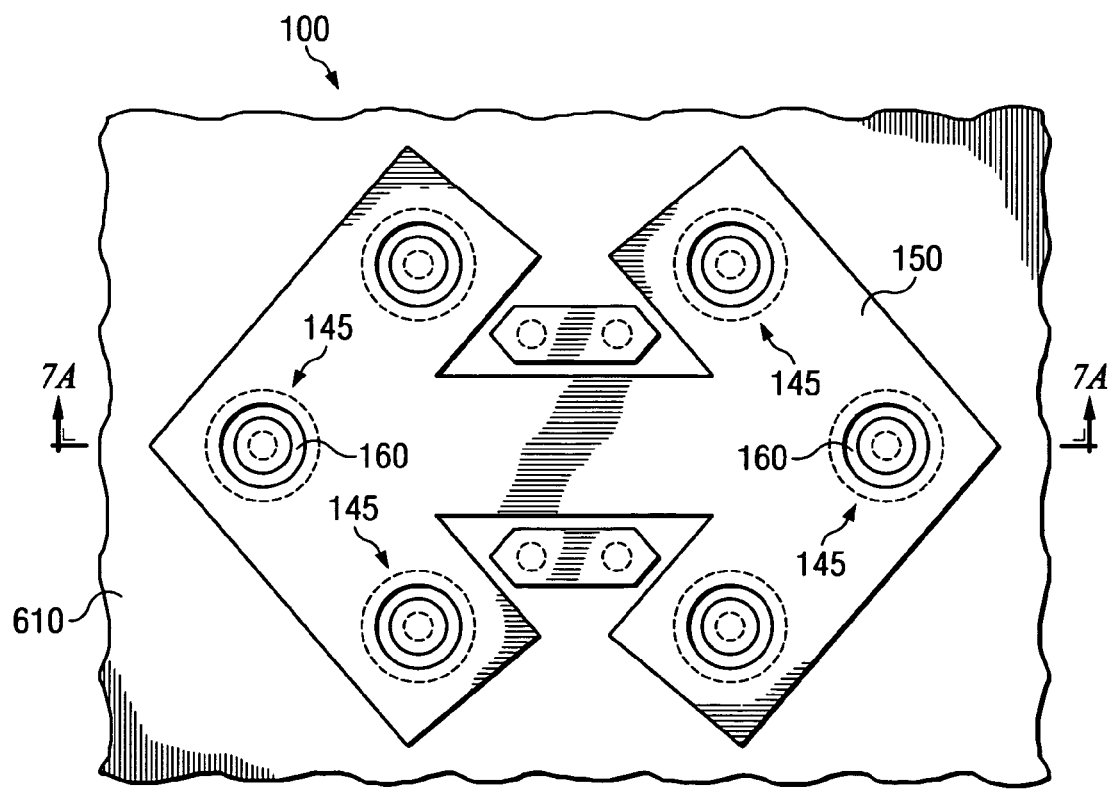

Turning now to FIGS. 7A and 7B, illustrated are a cross-sectional view and a plan view, respectively, of the DMD 100 illustrated in FIGS. 6A and 6B, respectively, after removing the patterned layer of hinge support material 160 from over the upper surface of the patterned layer of hinge material 150. In an exemplary embodiment, a portion of the patterned layer of hinge support material 160 remains within the one or more openings 145. Wherein the layer of hinge support material 160 comprises an oxide, as briefly discussed above, an oxide mask strip could be used for its removal. While the process used to strip the oxide mask may vary, one embodiment of the present invention uses a fluorine based plasma with the addition of no oxygen. Advantageous to the present invention, this fluorine based plasma is very selective to the oxide mask and not the layer of hinge material 150.

Figure 8A:
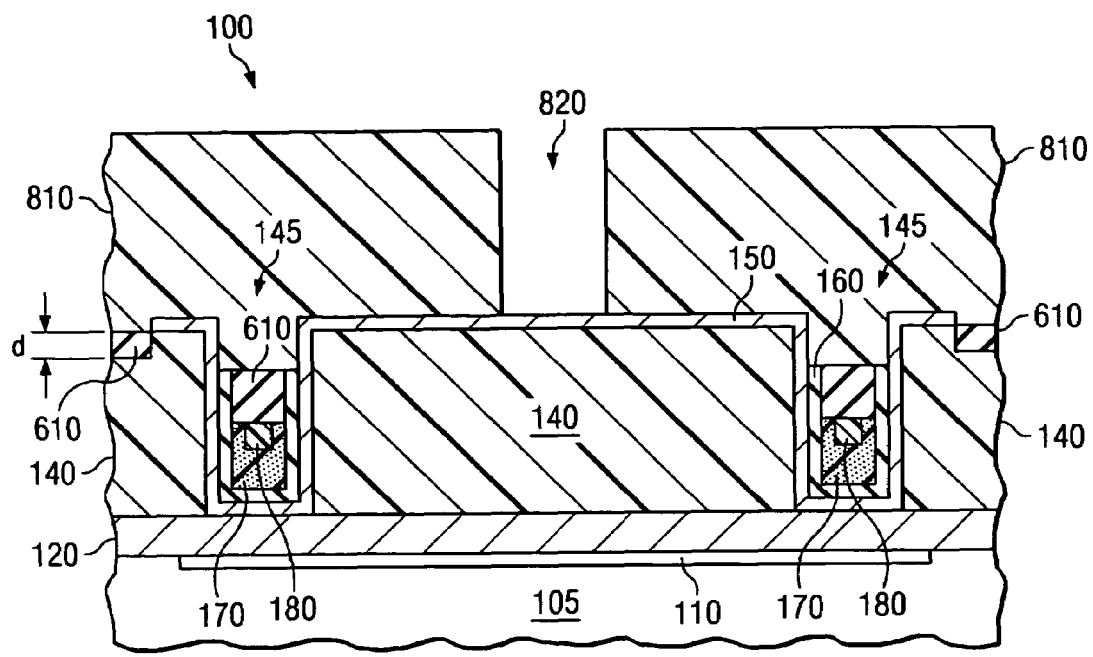
Figure 8B:
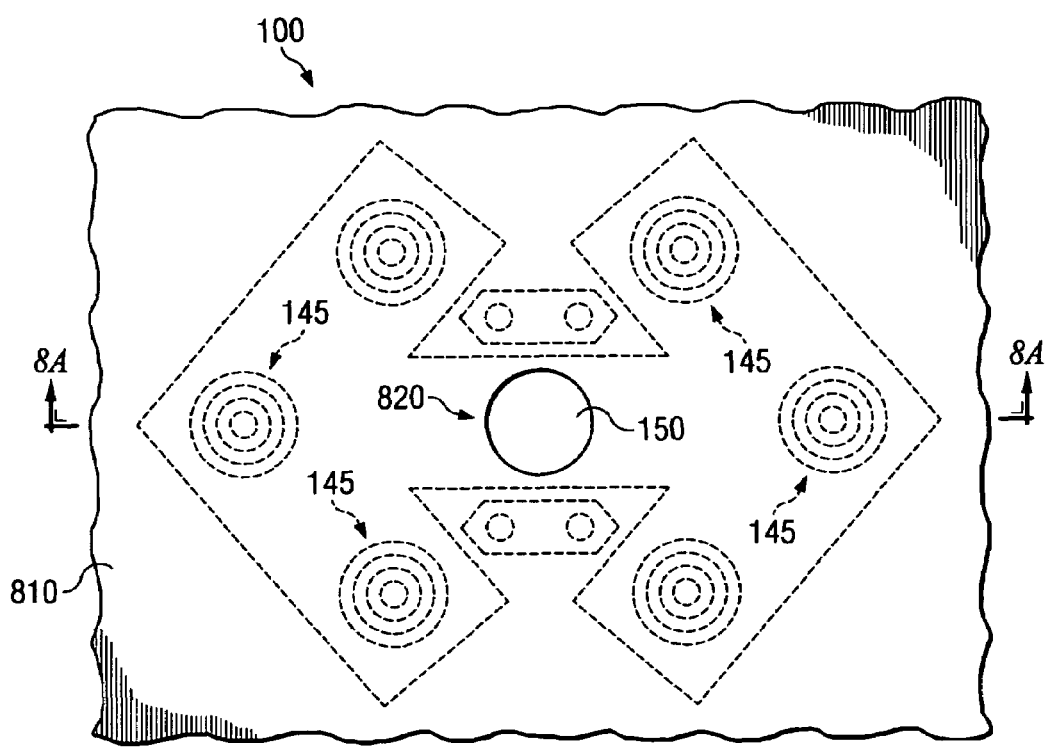

Turning now to FIGS. 8A and 8B, illustrated are a cross-sectional view and a plan view, respectively, of the DMD 100 illustrated in FIGS. 7A and 7B, respectively, after forming a second spacer layer 810 over the patterned layer of hinge material 150. Preferably the second spacer layer 810 is formed by spin depositing a photoresist to a thickness ranging from about 500 nm to about 1500 nm. The thickness of the second spacer layer 810 may be reduced, at least from its conventional thickness, because of the superior planarization that results from the reduced etched portions and the filling material 610. Thereafter, an opening 820 may be formed within the second spacer layer 810. Conventional patterning and etching techniques may be used to form the opening 820 in the second spacer layer 810, including a process substantially similar to that used to form the openings 145 in the first spacer layer 140. The patterned second spacer layer 810 may then be deep UV hardened to a temperature of around about 175° C. to prevent flow and bubbling during subsequent processing steps.

Figure 9A:
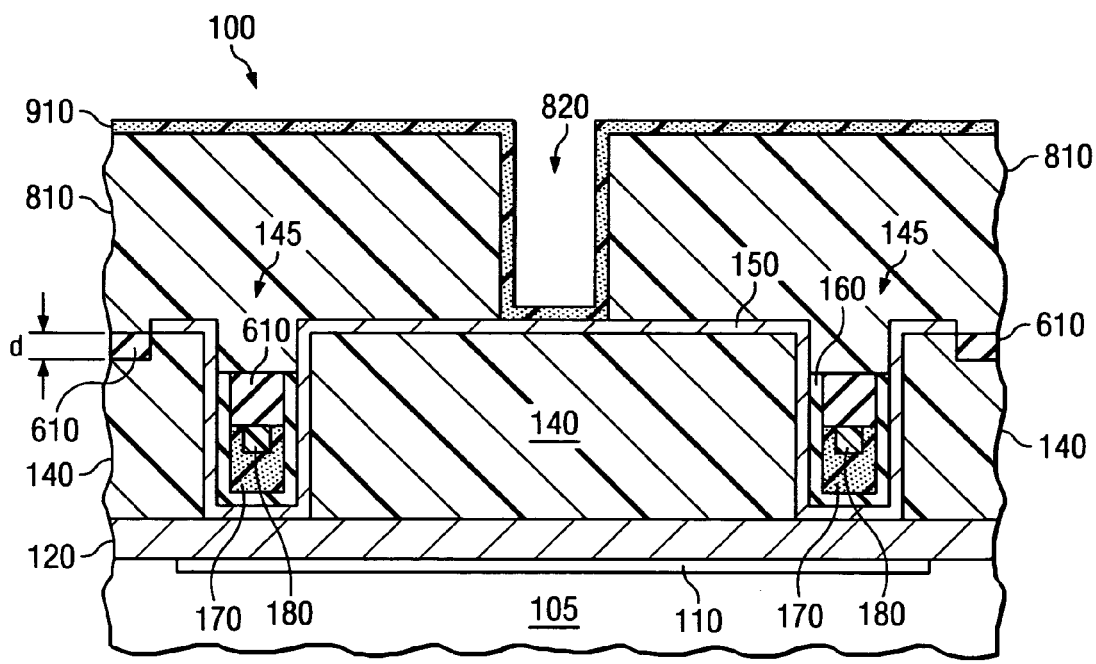
Figure 9B:
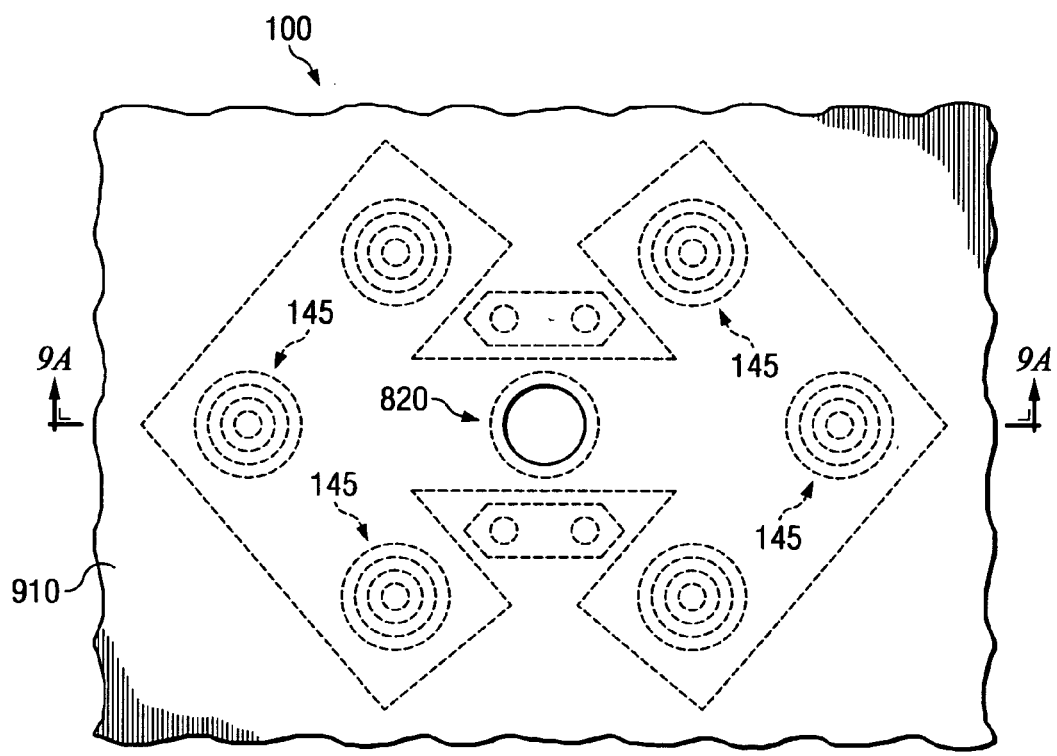

Turning now to FIGS. 9A and 9B, illustrated are a cross-sectional view and a plan view, respectively, of the DMD 100 illustrated in FIGS. 8A and 8B, respectively, after forming a layer of reflective material 910 over the second spacer layer 810. In the embodiment of FIGS. 9A and 9B, the layer of reflective material 910 is deposited on the second spacer layer 810, as well as in the opening 820 in the second spacer layer 810. The layer of reflective material 910 advantageously has a thickness ranging from about 200 nm to about 500 nm, and more particularly a thickness ranging from about 300 nm to about 350 nm. Preferably the layer of reflective material 910 comprises aluminum or an aluminum alloy and is formed using similar procedures and materials as described above for the layer of hinge material 150.

Figure 10A:
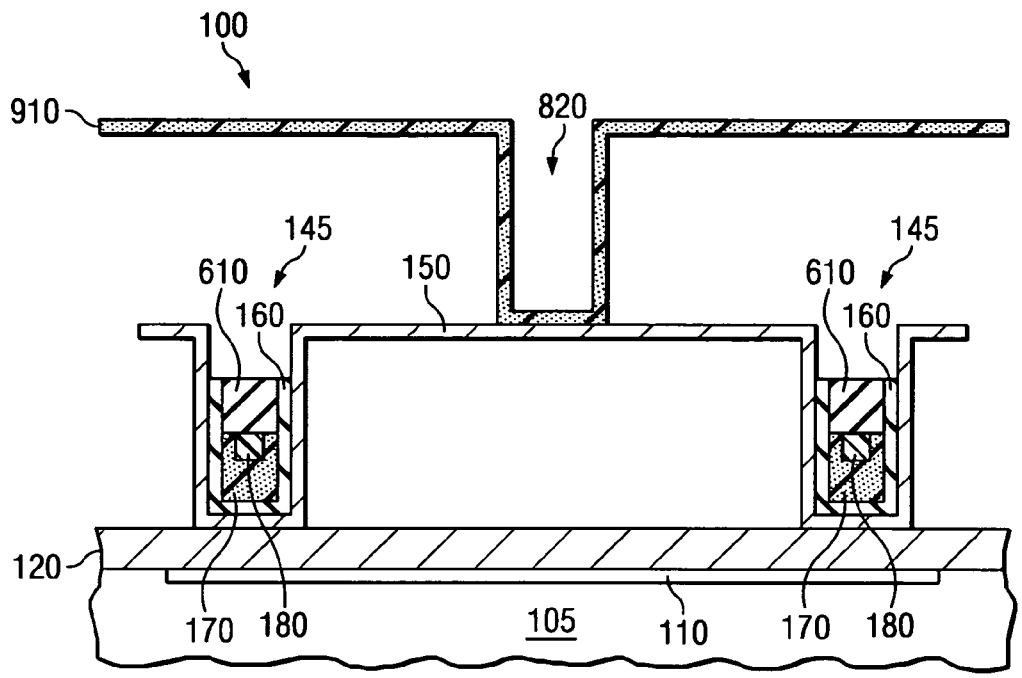
Figure 10B:
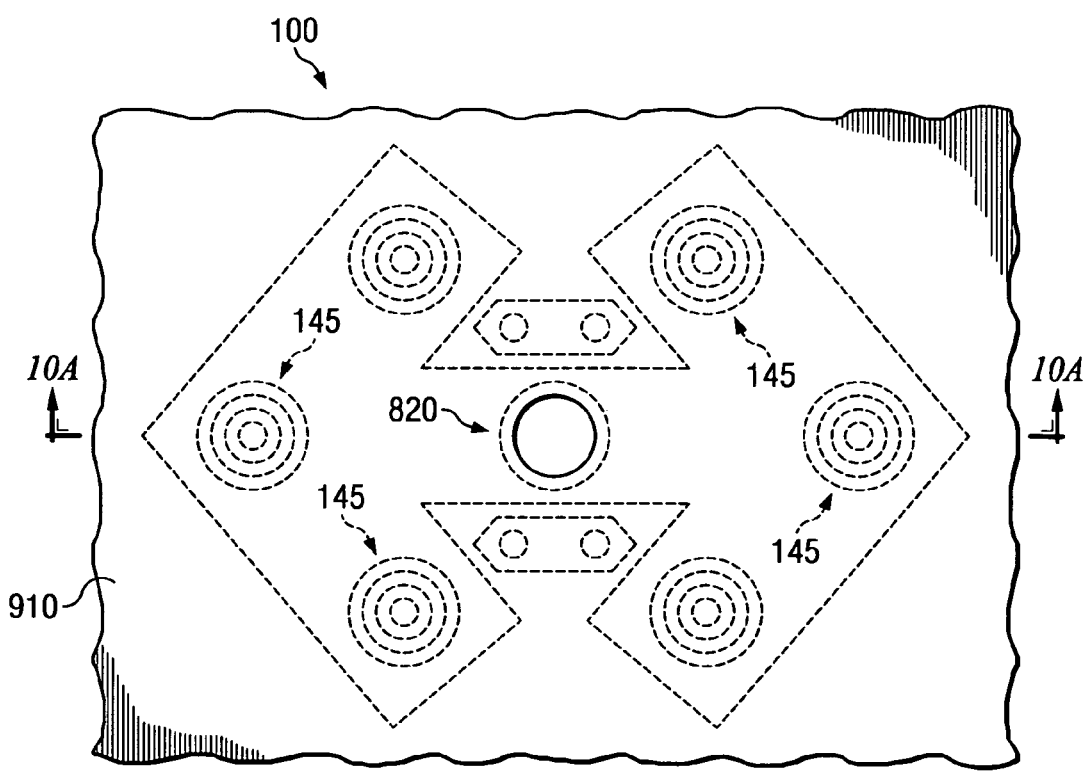

Turning now to FIGS. 10A and 10B, illustrated are a cross-sectional view and a plan view, respectively, of the DMD 100 illustrated in FIGS. 9A and 9B, respectively, after patterning the layer of reflective material 910 and then removing the first spacer layer 140 and the second spacer layer 810. As those skilled in the art appreciate, an etch mask, such as a plasma-deposited silicon dioxide etch mask, may be used to assist in the etching of the layer of reflective material 910. What results is an array of reflective surfaces or mirrors.

The removal of the first spacer layer 140 and of the second spacer layer 810 is conventional. For example, a conventional downstream plasma ashing or other similar process may be used to remove the first spacer layer 140 and the second spacer layer 810. Nevertheless, other known or hereafter discovered processes could also be used while staying within the scope of the present invention. The resulting device, as is shown in FIG. 10A, may have the one or more vias in the layer of hinge material 150 being at least partially filled with one or more of the layer of hinge support material 160, the BARC layer 170, the photoresist 180 and the filling material 610.

The benefits achieved using the inventive method for manufacturing a DMD device in accordance with the principles of the present invention are numerous. First, very little trenching into the first spacer layer occurs. The lack of trenching into the first spacer layer is mostly due to the fact that the removal of the thin layer of hinge support material used as the hardmask to etch the layer of hinge material, per the present invention, does not etch into the first spacer layer as much as the removal of the patterned photoresist layer typically used to etch the layer of hinge material. Second, a significant plug remains in the openings in the first spacer layer. Both of the aforementioned attributes lead to mirrors with ultra flat surfaces.

Another benefit from the novel method disclosed herein, is that hinge support layers that have critical dimensions (CD's) less than 0.3 micron are still supported by the first spacer layer on the bottom side after the hinge support layers have been etched and cleaned. Without such, the conventional isotropic downstream ashing used in the cleaning of the patterned layer of hinge material causes the first spacer layer to completely undercut from these narrow structures. Accordingly, subsequent liquid processing of the hinge support layers after the aforementioned undercut produces various amounts of bending and breaking of the layer of hinge material. Moreover, even layers of hinge material that span between two support vias are damaged due to the large capillary liquid forces that pull the layer of hinge material down to the undercut first spacer layer surface. This surface tension phenomena would produce hinges with severe sag and pre-torque, which are physical characteristics that would definitely result in complete DMD failure. Accordingly, the present invention provides the ability to manufacture hinge structures with CD's below about 0.3 microns, without the above-discussed problems.

Figure 11:
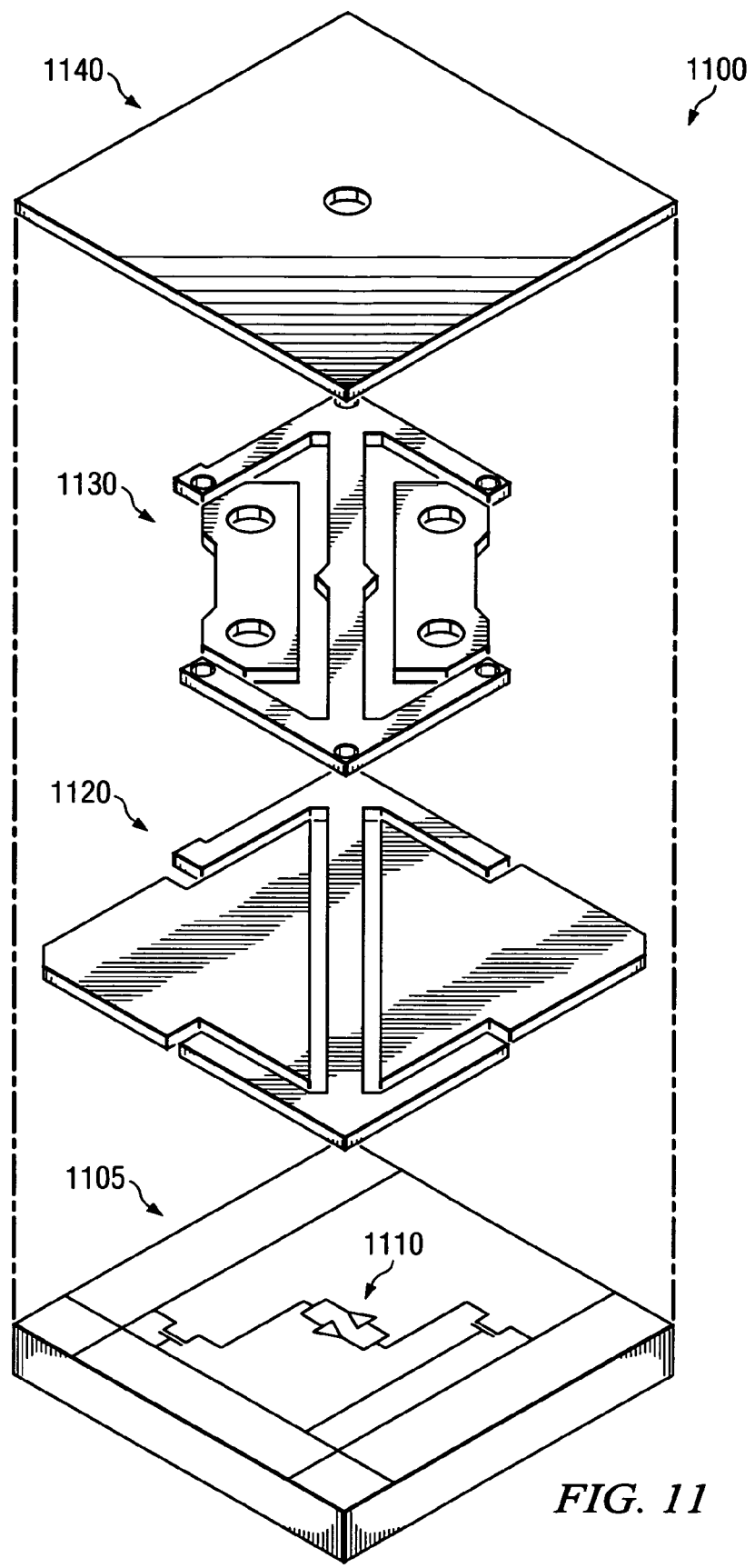
FIG. 11 illustrates an exploded view of a completed digital micromirror device manufactured in accordance with the principles of the present invention.

Turning now to FIG. 11, illustrated is an exploded view of a completed DMD 1100 manufactured in accordance with the principles of the present invention. The DMD 1100 illustrated in FIG. 11 includes, among other elements, a semiconductor substrate 1105 having control circuitry 1110 located therein, a patterned conductive layer 1120 located over the control circuitry 1110, a patterned layer of hinge material 1130 located over the patterned conductive layer 1020, and a patterned layer of reflective material 1140 located over the patterned layer of hinge material 1130. The semiconductor substrate 1105, control circuitry 1110, patterned conductive layer 1120, patterned layer of hinge material 1130, and patterned layer of reflective material 1140 are similar or slight variations of the semiconductor substrate 105, control circuitry 110, patterned conductive layer 120, patterned layer of hinge material 150, and patterned layer of reflective material 910, respectively, illustrated in FIGS. 10A and 10B.

Figure 12:
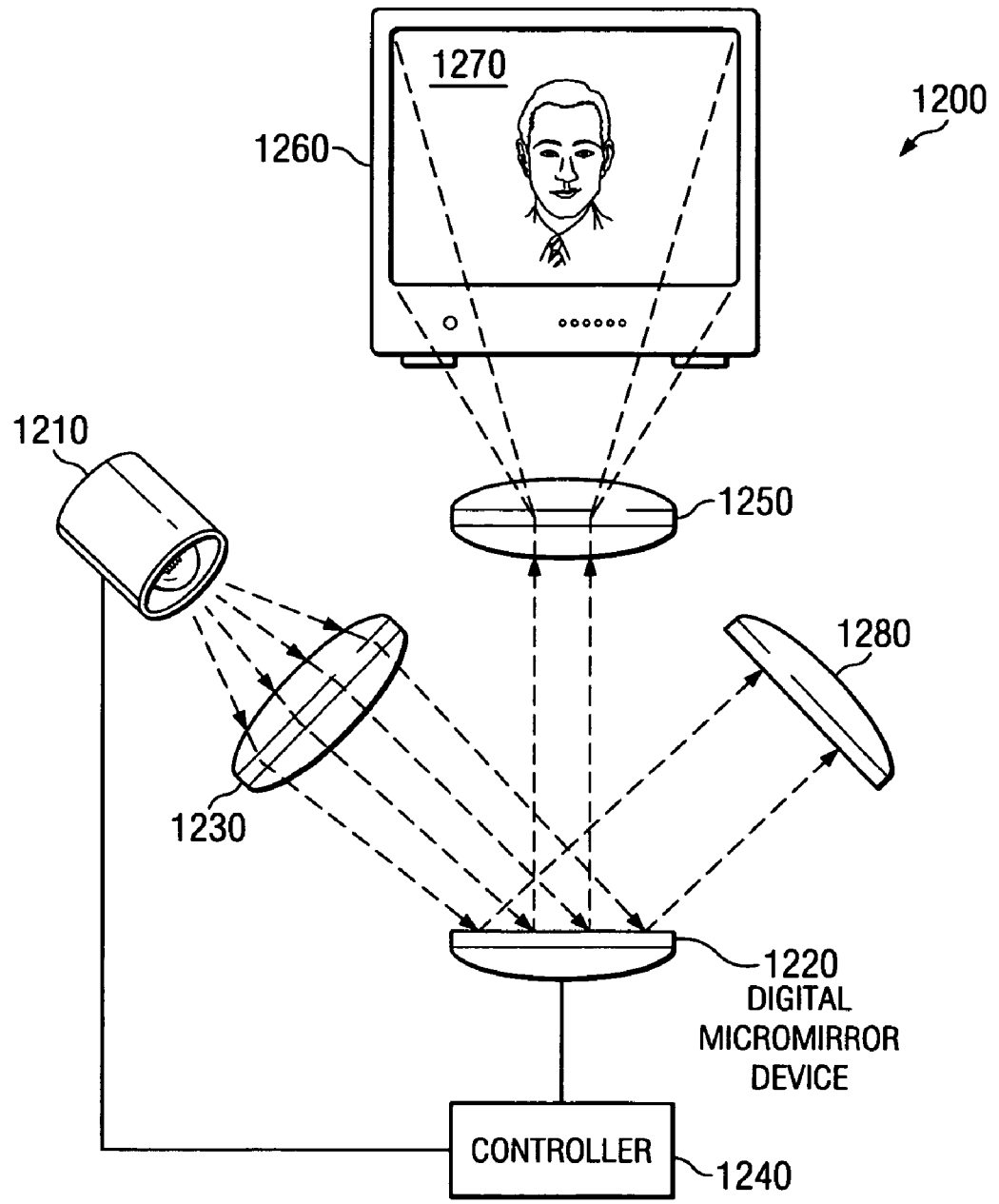
FIG. 12 illustrates a schematic of a projection display system manufactured in accordance with the principles of the present invention.

Turning now to FIG. 12, illustrated is a block diagram of a projection display system 1200 incorporating digital micromirror device(s) manufactured in accordance with the principles of the present invention. In the projection display system illustrated in FIG. 12, illumination from a light source 1210 is focused on to the surface of one or more DMD(s) 1220 by means of a condenser lens 1230 placed in the path of the light. An electronic controller 1240 is connected to both the DMD(s) 1220 and the light source 1210 and used to modulate the DMD(s) 1220 and to control the light source 1210.

For all DMD pixels in the ON state, the incoming light beam is reflected into the focal plane of a projection lens 1250, where it is magnified and projected on to a viewing screen 1260 to form an image 1270. On the other hand, DMD pixels in the OFF state, as well as any stray light reflected from various near flat surfaces on and around the DMD, are reflected into a light trap 1280 and discarded.

Although the present invention has been described in detail, those skilled in the art should understand that they could make various changes, substitutions and alterations herein without departing from the spirit and scope of the invention in its broadest form.

What is claimed is:

1. A method for manufacturing a digital micromirror device, comprising:
   providing a material stack, the material stack including a spacer layer having one or more openings therein and located over control circuitry located on or in a semiconductor substrate, a layer of hinge material located over the spacer layer and within the one or more openings, and a layer of hinge support material located over the layer of hinge material and within the one or more openings;
   patterning the layer of hinge support material using photoresist;
   patterning the layer of hinge material using the patterned layer of hinge support material as a hardmask; and
   removing substantially all of the patterned layer of hinge support material from over an upper surface of the patterned layer of hinge material.

2. The method as recited in claim 1 wherein the material stack further includes a bottom anti-reflective coating (BARC) layer located over the layer of hinge support material and within the one or more openings.

3. The method as recited in claim 2 wherein patterning the layer of hinge support material using photoresist includes patterning both the layer of hinge support material and the bottom anti-reflective coating (BARC) layer using the photoresist.

4. The method as recited in claim 1 further including removing the photoresist from over an upper surface of the hinge support material, thereby leaving a portion of the photoresist within the one or more openings, after patterning the layer of hinge support material and before patterning the layer of hinge material.

5. The method as recited in claim 1 wherein removing substantially all of the patterned layer of hinge support material from over an upper surface of the patterned layer of hinge material includes removing the patterned layer of hinge support material from over an upper surface of the patterned layer of hinge material thereby leaving a portion of the hinge support material within the one or more openings.

6. The method as recited in claim 1 wherein patterning the layer of hinge support material etches into the spacer layer a distance (d) of less than about 250 nm.

7. The method as recited in claim 6 further including forming a filling material within the one or more openings and in at least a portion of an etched region of the spacer layer after removing the patterned layer of hinge support material.

8. The method as recited in claim 1 wherein the spacer layer is a first spacer layer and further including forming a second spacer layer over the patterned layer of hinge material, the second spacer layer having an opening therein, and forming a layer of reflective material over the second spacer layer and within the opening.

9. The method as recited in claim 8 further including patterning the layer of reflective material and thereafter removing the first and second spacer layers.

10. The method as recited in claim 1 wherein the spacer layer is a photoresist spacer layer, the layer of hinge material is an aluminum containing layer of hinge material, and the layer of hinge support material is a layer of oxide.

11. A method for manufacturing a projection display system, comprising:
   providing a light source configured to produce a beam of light along a first light path;
   positioning optics in the first light path, the optics configured to provide one or more color light beams;
   forming one or more digital micromirror devices configured to receive the color light beams from the optics, modulate the light on a pixel-by-pixel basis and reflect light from ON pixels along a second light path, including:
   forming a material stack, the material stack including a spacer layer having one or more openings therein and located over control circuitry located on or in a semiconductor substrate, a layer of hinge material located over the spacer layer and within the one or more openings, and a layer of hinge support material located over the layer of hinge material and within the one or more openings;
   patterning the layer of hinge support material using photoresist;
   patterning the layer of hinge material using the patterned layer of hinge support material as a hardmask; and
   removing substantially all of the patterned layer of hinge support material from over an upper surface of the patterned layer of hinge material; providing control electronics for receiving image data and controlling the light source and the modulation of the digital micromirror devices; and providing projection optics placed in the second light path magnifying and projecting an image on to a viewing screen.

12. The method as recited in claim 11 wherein the material stack further includes a bottom anti-reflective coating (BARC) layer located over the layer of hinge support material and within the one or more openings.

13. The method as recited in claim 12 wherein patterning the layer of hinge support material using photoresist includes patterning both the layer of hinge support material and the bottom anti-reflective coating (BARC) layer using the photoresist.

14. The method as recited in claim 11 further including removing the photoresist from over an upper surface of the hinge support material, thereby leaving a portion of the photoresist within the one or more openings, after patterning the layer of hinge support material and before patterning the layer of hinge material.

15. The method as recited in claim 11 wherein removing substantially all of the patterned layer of hinge support material from over an upper surface of the patterned layer of hinge material includes removing substantially all of the patterned layer of hinge support material from over an upper surface of the patterned layer of hinge material thereby leaving a portion of the hinge support material within the one or more openings.

16. The method as recited in claim 11 wherein patterning the layer of hinge support material etches into the spacer layer a distance (d) of less than about 250 nm.

17. The method as recited in claim 16 further including forming a filling material within the one or more openings and in at least a portion of an etched region of the spacer layer after removing the patterned layer of hinge support material.

18. The method as recited in claim 11 wherein the spacer layer is a first spacer layer and further including forming a second spacer layer over the patterned layer of hinge material, the second spacer layer having an opening therein, and forming a layer of reflective material over the second spacer layer and within the opening.

19. The method as recited in claim 18 further including patterning the layer of reflective material and thereafter removing the first and second spacer layers.

20. The method as recited in claim 11 wherein the spacer layer is a photoresist spacer layer, the layer of hinge material is an aluminum containing layer of hinge material, and the layer of hinge support material is a layer of oxide.

* * * * *